US006865931B1

(12) United States Patent
Ziarati

(10) Patent No.: US 6,865,931 B1
(45) Date of Patent: Mar. 15, 2005

(54) EMERGENCY TIRE INFLATION APPARATUS

(76) Inventor: Gholamreza Ziarati, 1308 W. Brevard St., Apt. #237, Tallahassee, FL (US) 32304

( * ) Notice: Subject to any disclaimer, the term of this patent is extended or adjusted under 35 U.S.C. 154(b) by 0 days.

(21) Appl. No.: 10/429,783

(22) Filed: May 6, 2003

Related U.S. Application Data

(63) Continuation-in-part of application No. 09/779,579, filed on Feb. 9, 2001, now Pat. No. 6,557,404.

(51) Int. Cl.[7] .............................................. B60C 23/02
(52) U.S. Cl. ..................................................... 73/146.8
(58) Field of Search ............................ 73/146.2, 146.3, 73/146.8, 146; 152/151, 152, 152.1

(56) References Cited

U.S. PATENT DOCUMENTS

| 1,142,272 A | 6/1915 | Lipman |
| 1,259,431 A | 3/1918 | Nelson |
| 1,475,252 A | 11/1923 | Swanjord |
| 1,492,838 A | 5/1924 | Dilweg |
| 2,227,601 A | 1/1941 | O'Brien, Jr. |
| 2,237,559 A | 4/1941 | Jenne |
| 2,278,664 A | 4/1942 | Mitchell |
| 2,663,348 A | 12/1953 | Farris |
| 4,037,638 A | 7/1977 | Mosca |
| 4,269,312 A | 5/1981 | Bressler |
| 4,852,624 A | 8/1989 | Belrose |
| 5,419,377 A | 5/1995 | Harris |
| D360,457 S | 7/1995 | Levisay |
| 5,928,443 A | 7/1999 | Jorda et al. |

FOREIGN PATENT DOCUMENTS

| FR | 628019 | 8/1928 |
| FR | 984569 | 7/1951 |
| GB | 242792 | 11/1925 |

*Primary Examiner*—William Oen
(74) *Attorney, Agent, or Firm*—Dowell & Dowell, P.C.

(57) ABSTRACT

An apparatus for emergency inflation of vehicle tires which includes a air transfer tube communicating at its opposite ends with a pair of air valve chucks each of a size to cooperatively engage and selectively open an air valve of a conventional tire to thereby permit a regulated transfer of air between two or more vehicle tires and wherein a sleeve having a control valve and pressure guage is mounted between one of the valve chucks and the air transfer tube.

18 Claims, 5 Drawing Sheets

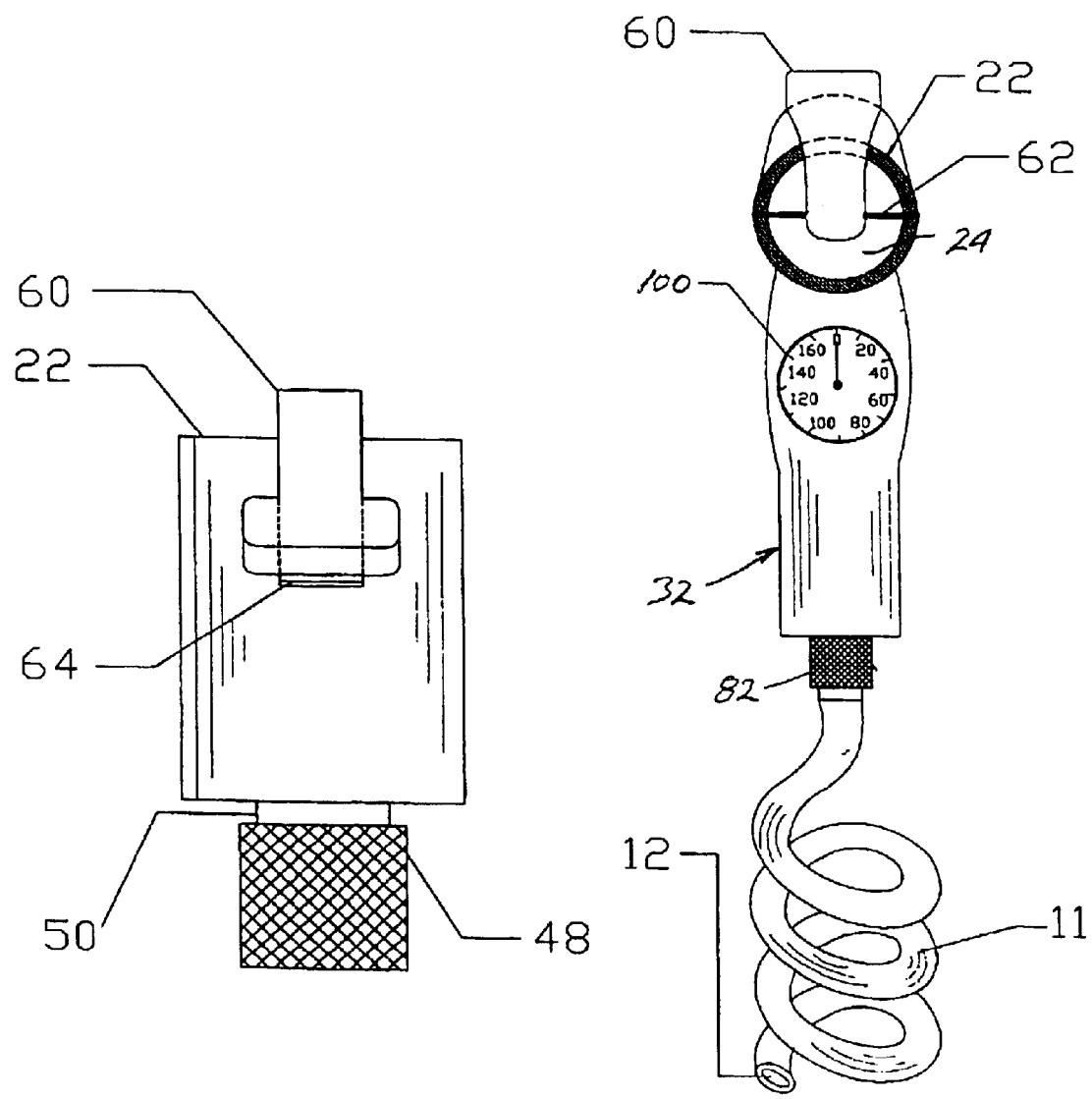

EMERGENCY TIRE INFLATION APPARATUS

CROSS REFERENCE TO RELATED APPLICATIONS

This application is a continuation-in-part application of U.S. application Ser. 09/779,579 filed Feb. 9, 2001 now U.S. Pat. No. 6,557,404 in the names of the same inventor.

BACKGROUND OF THE INVENTION

1. Field of the Invention

This application is generally directed to devices for providing emergency inflation of vehicle tires or other articles and more specifically to a tire inflation apparatus which provides an elongated pliable air transfer tube with similar valve chucks being mounted at opposite ends of the tube. The valve chucks may be secured to valve stems of conventional tires to provide for transfer of air from inflated tires to a deflated tire. A control valve and pressure gauge are incorporated with a rotatable sleeve secured to one of the valve chucks.

2. Brief Discussion of the Related Art

Most vehicle drivers have at one time or another experienced the inconvenience of a flat tire. Flat tires are often caused by faulty valves or by slow leaks created by punctures created by sharp objects which may remain in place, such as when a nail penetrates a tread of a tire and becomes lodged in the tire but causes a slow leak of pressurized air. When a tire becomes flat, it is necessary to stop a vehicle and either inflate the tire or replace the tire with a spare, if a spare tire is available. However, there are many instances where individuals can not physically change a tire or where, due to the lack of or faulty tire changing equipment, such as jacks and jack handles, it is not possible to effect a change between a flat tire and a spare.

There have been numerous products developed to provide for emergency inflation of vehicle tires to permit emergency use of a vehicle so that vehicle can be driven to a repair facility wherein the damaged tire can be properly fixed or replaced. Some such innovations include hand or foot operated pumps or battery operated pumps which may be connected to a vehicle electrical system to inject air into a flat tire. Unfortunately, hand or foot operated type pumps require a great deal of physical ability and, in many cases, individuals can not properly operate such devices. Further, even where an individual can physically work a hand or foot operated pump, it is often a slow and tedious process to inflate a tire to a degree wherein a vehicle can be safely moved. Likewise, many battery operated pumps are slow and inefficient.

Another type of emergency inflation device includes containers having pressurized substances therein which substances may be injected through a valve of a conventional tire for sealing the interior surface of the tire and to provide a measure of pressurized gas to allow for emergency movement of the vehicle. Unfortunately, such inflation devices must be purchased ahead of time and have limited storage life. Further, once a container is used, it must be replaced, thereby requiring an expenditure of funds for the replacement container.

In view of the foregoing, there have been other innovations developed to permit transfer of air between a spare tire or other tires of a vehicle and a flat tire. By way of example, in U.S. Pat. No. 1,492,838 to Dilweg, a device for transmitting compressed air between two vehicle tires is disclosed which includes a flexible tube having air chucks at each end which are adapted to be engaged such that one chuck is connected to open the valve stem of a flat tire and the opposite chuck is utilized to open the valve stem of an inflated tire such that pressure from the inflated tire is transferred to the flat tire. Unfortunately, devices as disclosed in the reference to Dilweg do not adequately provide for a safe and efficient transfer of air pressure, especially in instances where the flat tire is not caused by a slow leak but has been caused by a slash or large hole in the tire, such that the tire can not retain any air pressure. If a badly damaged flat tire is connected to an inflated tire, the air from the inflated tire will continuously bleed through the damaged tire resulting in the complete depletion of pressurized air from the inflated tire thus creating a situation where the vehicle now has two tires which are inoperative.

In an effort to improve upon the basic concept of providing an air transfer tube to permit the transfer of pressurized air from an inflated tire to a deflated tire, special valves have been proposed to limit the transfer of air to a deflated tire. In U.S. Pat. No. 4,269,312 to Bressler such a device is disclosed wherein one of the chucks includes a spring biased check valve for cutting off flow from the inflated tire to the deflated tire when pressure entering the chuck is at a predetermined level. Unfortunately, if the damaged tire has been badly damaged there will have been a transfer of a significant portion of air from the inflated tire before the flow of pressurized air is terminated thus making the vehicle relatively unsafe to drive.

In view of the foregoing, there remains a need to provide for a device for transferring air between the tires of a vehicle, including a spare tire, and a tire which has been deflated wherein the device can be used without depleting the air pressure of a pressurized tire in the event the tire to receive air is badly damage such that it can not retain air pressure, thus preventing the adverse depletion of air from good tires when attempting to inflate flat tires.

Some additional examples of prior art air transfer devices are disclosed in U.S. Pat. No. Des 360,457 to Levisay, U.S. Pat. No. 2,663,348 to Farrish, U.S. Pat. No. 4,037,638 to Mosca, U.S. Pat. No. 5,419,377 to Harris and U.S. Pat. No. 5,928,443 to Jorda et al.

SUMMARY OF THE INVENTION

The present invention is directed to an emergency vehicle tire inflation apparatus which includes a pliable air transfer device which is preferably in the form of an elongated coiled tube having opposite ends. The air transfer tube defines an air flow passageway. A pressure gauge is mounted in communication with the air transfer tube so as to measure pressure within the air passageway. Special valve chucks are provided at each of the ends of the air transfer or inflation tube with each valve chuck being, in a preferred embodiment, similarly constructed so the valve chucks may be used interchangeably with a deflated or an inflated tire.

Each air valve chuck includes a first connector for connecting the valve chuck to a rotatable sleeve which is disposed between the valve chuck and the air transfer tube and a second rotatable connector which is designed to cooperatively seat with and seal against a conventional valve stem of a vehicle tire so that the valve chuck may be seated in sealed engagement with a valve stem prior to the valve of the valve chuck being opened. The valve of the valve chuck is movable from a first position in which air flow through the valve chuck is prohibited to a second position wherein a pin member of the valve opens the valve stem of the conventional vehicle tire and a fluid passageway through the valve chuck is opened between the air transfer tube and the valve stem. In preferred embodiments, the operation of the valve chuck assembly is controlled by a pivotable lever or handle which is mounted slightly off-center to provide a camming surface to move the valve member from one position to another and such that the valve member is retained in an open position unless closed by manual movement of the handle or lever.

In preferred embodiments, a separate control valve is provided within one of the rotatable sleeves to control air flow therethrough without the need to operate the valve chucks once the valve chucks are placed in an operative position and opened to permit air flow therethrough. The control valve is normally urged to a closed position to prevent air transfer through the air transfer tube but is opened by manual manipulation of a trigger or lever to permit air flow therethrough.

The invention is also directed to a method of safely transferring air from a spare tire or an inflated vehicle tire to another tire of a vehicle wherein an air transfer tube is provided having valve chucks at opposite ends such that the air transfer tube may be secured between the valve stem of one tire and the valve stem of another tire without initially allowing any air transfer between the tires. Further, with the methodology of the invention, a pressure gauge is mounted to the sleeve in which the control valve is housed such that by opening each valve chuck individually, a pressure reading can be taken with respect to each of the tires to which the air transfer tube is secured. Using the methodology, monitoring pressure of a deflated tire for a short period of time will give an accurate reflection of whether the deflated tire has a type of leak which will allow emergency inflation for limited roadway use, such as when the cause of the leak of the deflated tire will allow a retention of air pressure for a period of time as opposed to a leak caused by a large opening in the tire which will prevent the tire from retaining air pressure.

Using the apparatus of the present invention, it is possible to transfer air between tires, such as from an inflated to a deflated tire, without accidentally releasing air pressure through the deflated tire to atmosphere. Further, utilizing the apparatus and methodology of the invention, it is possible to use only a portion of the pressurized air from several tires to inflate and balance pressure between not only the deflated tire but between all the tires of a vehicle so that the tire pressures are balanced before a vehicle is moved under emergency conditions.

Because of the placement of the control valves and pressure gauge within one of the sleeves adjacent to one of the valve chucks, the present invention permits an operator to control the transfer of air and monitor air pressure of the tires to which the air transfer tube is secured while positioned adjacent to one of the tires, and preferably while positioned adjacent to a tire to be inflated.

Further, the sleeves are specifically designed to be rotatable relative to the air transfer tube and the valve chucks after being mounted thereto so as to allow ease of manipulation of the invention during use.

It is a primary object of the present invention to provide an air transfer device which can be used to transfer air pressure from one or more tires of a vehicle to a deflated or other tires of the same or another vehicle wherein accidental loss of air pressure due to a badly damaged deflated tire is prevented and wherein the balancing of pressure between various tires of a vehicle may be accomplished with a gauge being provided to ensure accurate measurement and balancing of air pressures.

It is yet a further object of the present invention to provide an emergency apparatus for allowing the inflation of a tire having a minor leak therein wherein the device can be easily stored in a vehicle and may be used not only to transfer air between tires of a single vehicle but wherein air can be transferred from one or more tires on one vehicle to one or more tires of another vehicle with tire pressures being monitored as air is transferred from one tire to another.

It is also an object of the invention to provide an emergency air transfer device for permitting inflation or balancing air pressure of tires on a vehicle wherein control of pressurized air transfer and monitoring of air pressures is provided by a control valve and air gauge mounted adjacent to a valve chuck which is mounted to a valve stem of one of the tires to which the device is secured.

BRIEF DESCRIPTION OF THE DRAWINGS

A better understanding of the invention will be had with respect to the attached drawing figures wherein:

FIG. 7 is a front elevational view of the valve chuck of FIG. 4; and

FIG. 8 is a partial top plan view of the invention showing the pressure gauge mounted to the rotatable sleeve which houses the control valve.

DESCRIPTION OF THE PREFERRED EMBODIMENT

Figure 1:
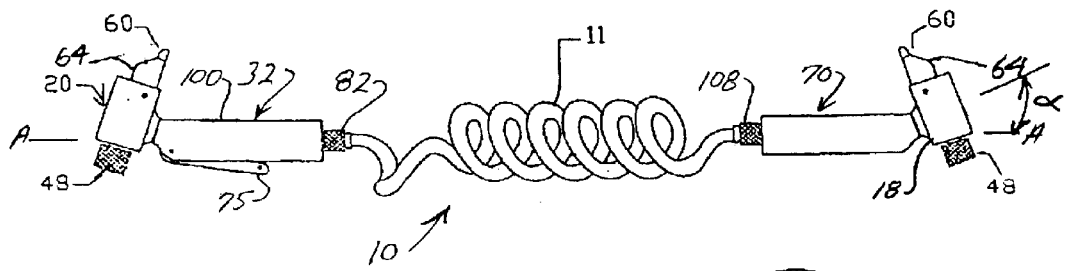
FIG. 1 is a front elevation view of an air transfer apparatus in accordance with the present invention.

With continued reference to the drawing figures, the vehicle air inflation apparatus 10 of the present invention is shown including an elongated pliable hollow tube 11 which, in a preferred embodiment, is coiled as shown in FIG. 1 to permit compact storage when the apparatus is not in use. The tube is constructed of material which will safely stand elevated pressures with the strength of the material varying depending upon the intended use. Therefore, the material for an inflation apparatus to be used with trucks will have a substantially greater resistance to air pressure than one designed for use with automotive vehicles.

Figure 3:
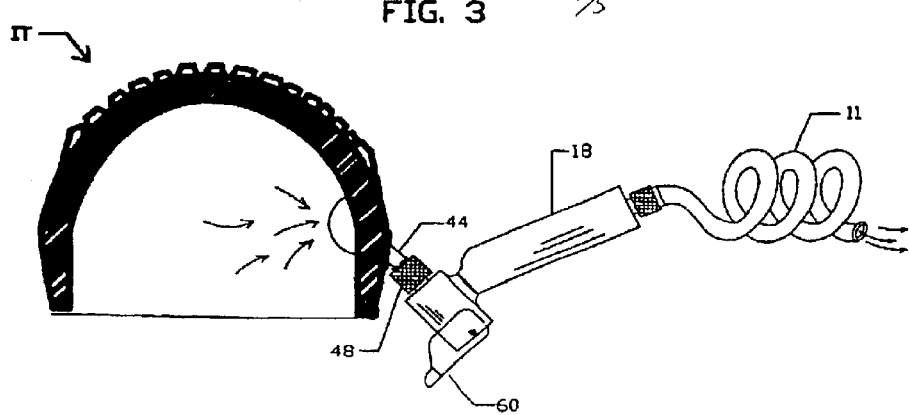
FIG. 3 is a partial cross-sectional illustrational view showing one of the valve chucks of the present invention as it is connected to a conventional valve stem of a vehicle tire.

The tube 11 defines a hollow passageway 12 through which air can be transferred. The hollow passageway is shown in FIGS. 3–5.

Figure 2:
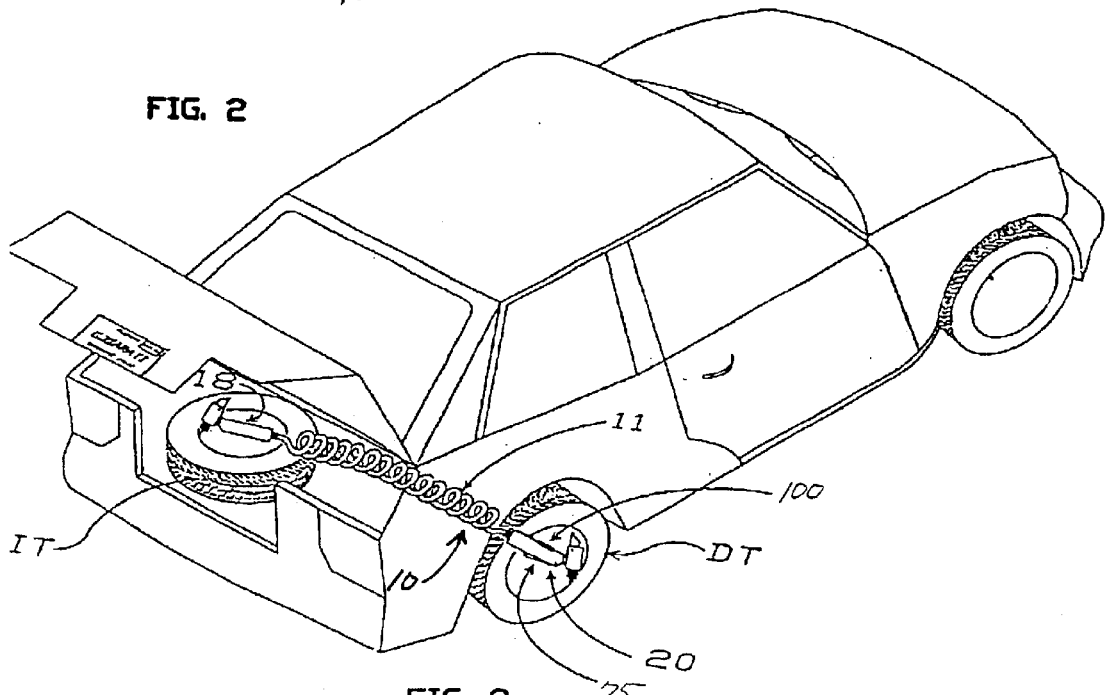
FIG. 2 is an illustrational view showing the apparatus of FIG. 1 connected between a spare tire and a flat tire of a vehicle.

The outer ends of the tube are connected to a pair of valve chuck assemblies 18 and 20 which, in the preferred embodiment, are of identical construction such that either valve chuck may be mounted to a deflated tire, such as shown at "DT" in FIG. 2, or to an inflated tire "IT", also shown in FIG. 2, to thereby allow regulated transfer of air from the inflated to the deflated tire.

Figure 4:
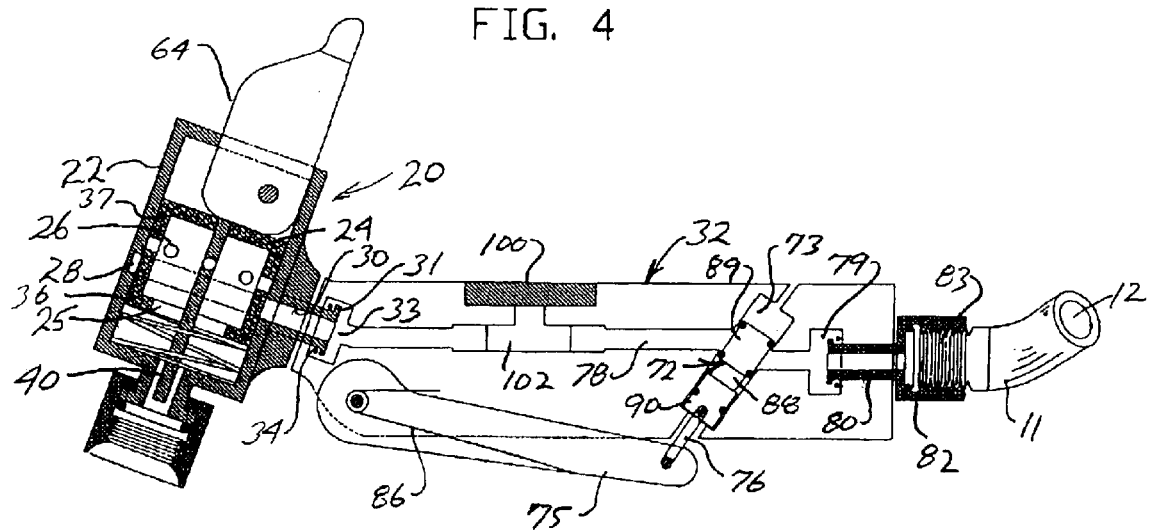
FIG. 4 is an enlarged cross-sectional view of a valve chuck and rotatable sleeve with control valve and pressure gauge of the present invention wherein the valve of the valve chuck is shown in a first closed position to prevent air flow therethrough and the control valve is also in a closed position to prohibit air flow through the air transfer tube.
Figure 5:
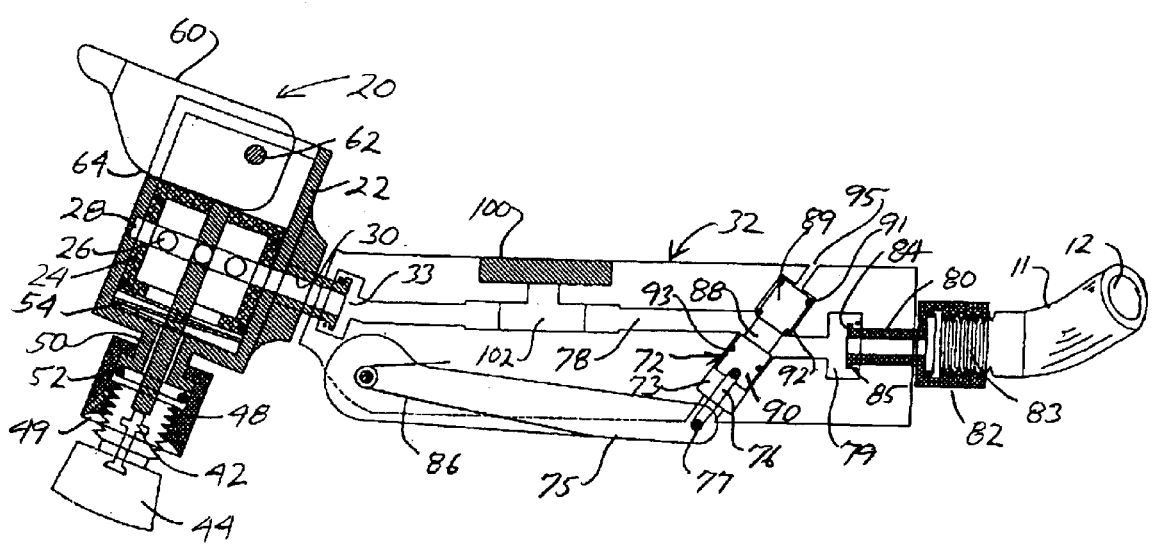
FIG. 5 is a cross-sectional view similar to FIG. 4 showing the valve of the valve chuck moved to an open position to permit air transfer therethrough and with the control valve also in an open position to permit air flow through the air transfer tube.
Figure 6:
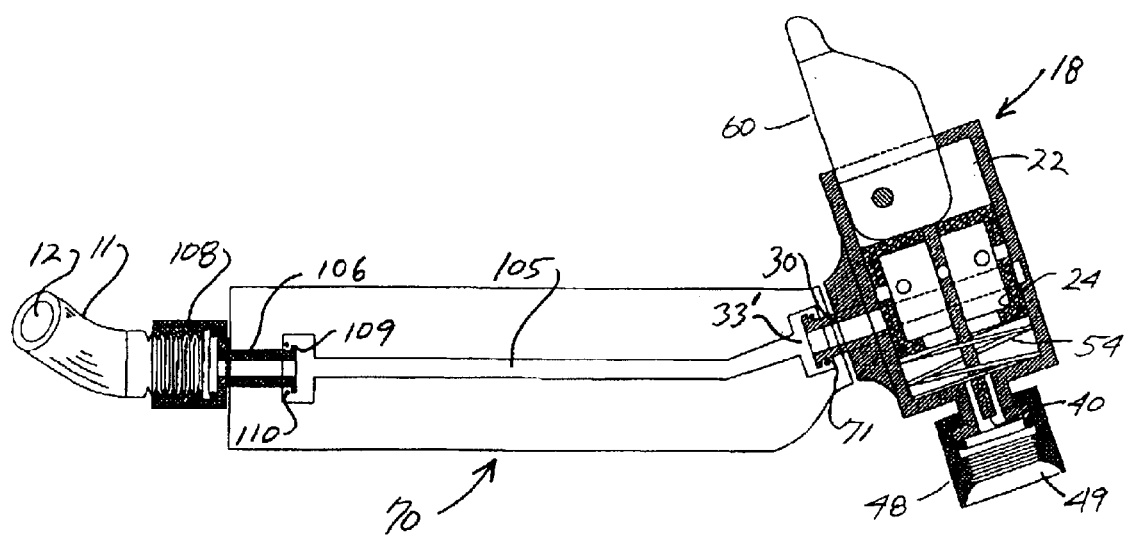
FIG. 6 is a cross sectional view of the valve chuck opposite the one shown in FIGS. 4 and 5 and another rotatable sleeve which connects the valve chuck to the air transfer tube.

With specific reference to FIGS. 4–6, the structure of the valve chucks is shown. Valve chuck 20 includes a generally cylindrical housing 22 in which is movably mounted a generally cylindrical valve 24. The valve 24 is open at it's forward end 25 to permit air flow which enters the valve through a plurality of openings 26 formed in the upper periphery thereof. The openings 26 communicate with an annular channel 28 formed within the housing which channel communicates with a fitting 30 extending from the housing and which is designed to be connected by way of a rotatable sleeve 32 to the air transfer tube 11. The fitting 30 includes an enlarged head as shown at 31 which is cooperatively received in opening 33 of the sleeve 32. A seal is provided by an o-ring 34 such that the sleeve is sealed relative to the fitting but rotatable with respect thereto.

Air pressure being transferred through the air valve chuck 20 is prevented from escaping the ends of the housing by providing a pair of o-rings 36 and 37 which are seated within annular grooves in the sidewalls of the valve 24 and which engage the inner surface of the housing 22.

The valve 24 further carries a plunger or pin 40 which extends forwardly thereof and which is operable to engage a valve member 42 associated with a conventional valve stem 44 of a vehicle tire.

The valve chuck 20 is selectively connected to the conventional valve stem 44 by way of an adapter or rotatable connector 48 which is mounted on a recessed neck 50 of the housing 22. An o-ring 52 is mounted adjacent to the neck 50 within the connector 48 for purposes of sealing the connector against the valve stem to prevent air leakage when the valve chuck is attached to a conventional valve stem, as shown in FIGS. 2 and 3. It should be noted that the connector 48 allows for the valve chuck 20 to be secured in place without rotation of the housing 22, as the connector 48 is rotatable relative to the housing and is internally threaded. Thus it can be secured by rotation of the body of the connector relative to the valve stem. The connector also includes an annular tapered flange 49 for facilitating alignment of the connector on a valve stem.

A spring 54 is provided, in a preferred embodiment, to normally urge the valve 24 to a first or closed position as shown in FIG. 4. In the first or closed position, the spaced openings 26 which allow fluid flow through the valve member 24 are spaced from the annular channel 28 formed in the sidewall of the housing 22 and thus there is no communication between the air transfer tube 11 and the sleeve 48 which is connected to the valve stem 44. In order to allow the transfer of air either to or from the valve stem 44, the valve 24 is moved to a second or open position, as shown in FIG. 5 of the drawings, wherein the openings 26 align with the channel 28 thereby permitting flow from the air transfer tube 11 to the valve stem 44 or vice-a-versa when a control valve is opened as will be described.

The movement of the valve member 24 between the first and second positions is controlled by operating a lever or handle 60. The lever is connected by a pivot pin 62 to an upper portion of the housing 22. The lever or handle includes a base which forms a camming surface 64 for pushing the valve member from the first to the second positions. The camming surface is somewhat offset with respect to the pivot pin 62 such that when the lever is rotated to the position shown in FIG. 5, the handle will not slip and must be manually maneuvered to move the valve to the position shown in FIG. 4.

With reference to FIG. 6, the opposite or other valve chuck 18 is identically constructed relative to valve chuck 20 and the same reference members are shown. As shown, valve chuck 18 includes a tubular fitting 30 housing an enlarged head which is seated within an opening 33' of a rotatable sleeve 70 which connects the valve chuck 18 to the air transfer tube 11. An o-ring seal 71 is provided to prevent leakage between the fitting 30 and the sleeve 70.

To control the passage of air through the air flow tube 11 between the valve chucks 18 and 20, the present invention includes a primary control valve 72 which is slidable mounted within a valve chamber 73 formed within the rotatable sleeve 32 as shown in FIGS. 4 and 5. The valve 72 is slidably movable by operation of a control lever 75 which is connected to one end of the valve by a linkage 76 which is pivotally connected at 77 adjacent to one end of the lever. The valve 72 is shown in FIG. 4 as being in a closed position to prevent fluid flow through an interior passageway 78 within the sleeve which communicates the opening 33 in which the fitting 30 of valve chuck 20 is rotatably mounted relative to an opening 79 to which a fitting 80 of a connector 82 is rotatably mounted. The connector 82 includes internal threads for receiving a threaded end member 83 of the air transfer tube 11. The fitting 80 includes an enlarged head 84 which is sealed by an o-ring 85 to prevent loss of fluid between the fitting and the sleeve 32. The valve 72 is normally retained in the closed position by a spring 86 which urges the lever to an outermost position as shown in FIG. 4.

To open the control valve 72, the lever or handle 75 is depressed toward the body of the sleeve 32 in order to shift the valve 72 such that a central portion 88 thereof is aligned with the passageway 78. The portion 88 of the valve 72 is of reduced diameter with respect to enlarged portions 89 and 90 thereof such that when aligned with the passageway, the air flows around the portion 88. A plurality of o-ring seals 91, 92 and 93 are provided to prevent escape of fluid from the valve chamber 73 as the valve is shifted between the open and closed position. With reference to FIG. 5, the valve is shown in the open position permitting fluid flow through the passageway 78. A small bleed opening 95 is provided which communicates with the valve chamber 73.

In order to monitor pressure of air being transferred through the air transfer tube as well as to test the integrity of the air transfer apparatus or test pressures within a vehicle tire, the present invention also provides an air gauge 100 which is mounted having a T-shaped base 102 which is in open communication with passageway 78 through the rotatable sleeve 32, as is shown in FIGS. 4 and 5.

As previously described, the sleeve 32 is rotatable relative both to valve chuck 20 and to the connector 82 by way of which the sleeve 32 is connected to the air transfer tube 11. This allows the sleeve to be rotatably oriented to suit an individual and to allow ease of alignment of the valve chuck 20 relative to a valve stem of a tire. Further, the rotational mounting of the sleeve 32 permits an individual to align the pressure gauge during use of the invention.

With specific reference to FIG. 6, valve chuck 18 is rotatably mounted relative to the sleeve 70 as previously described. The valve sleeve 70 has a central air or fluid flow passageway 105 therethrough which communicates the fitting of the valve chuck 18 with an open fitting 106 of a connector 108 connected to the air transfer tube 11. The fitting 106 has an enlarged end 109 which is sealed by an o-ring 110 to prevent leakage between the fitting 106 and the sleeve 70.

It should be noted with respect to FIGS. 4 through 6, in the preferred embodiment, the ends of each of the sleeves 32 and 70 which are connected to the valve chucks 20 and 18, respectively, are disclosed and angled outward at $\propto$ with respect to an elongated axis A—A, see FIG. 1, of the sleeves in order to facilitate the positioning of the valve chucks relative to a valve stem of a tire.

In the use of the vehicle tire inflation apparatus 10 of the present invention, in the event of a flat tire, the apparatus is placed into use by initially connecting the valve chuck 18 to the valve stem of an inflated tire and the valve chuck 20 to the valve stem of a deflated tire as is illustrated in FIG. 2. When initially placing the valve chucks 18 and 20 on the valve stems of their respective tires, the valve members 24 of each valve chuck are maintained in their first or closed position to prevent any loss of air pressure from the respective tires. With the valve members 24 in their closed position it is possible to move the valve member of the valve chuck 18 to an open position and thereafter, by opening the control valve 72 by operation of the control handle 75, taking an initial reading of the tire pressure of the inflated tire is determined. This initial determination is important for testing the apparatus itself to insure that there are no possible leaks. If the pressure gauge reading remains stable with respect to the inflated tire it is an indication that there is no leak within the apparatus. However, if a decrease in pressure is observed over a period of time, there is indication that the apparatus itself is damaged and should not be used.

It should be noted that although a spare tire is shown as being the inflated tire in drawing FIG. 2, it is within the teachings of the present invention that the air transfer tube 11 can be extended between any tire of the vehicle or between tires of separate vehicles. It is important that the apparatus of the present invention can be used to transfer air between any vehicle tire so that a proper balancing of pressures within the various tires of the vehicle can be accomplished to allow a very safe and stable movement of a vehicle after an emergency inflation has been performed.

Prior to transferring air between an inflated and deflated tire, the present invention should also be used to determine the initial pressure within the deflated tire. With the valve members of both valve chucks 18 and 20 in their first or closed positions and with the control valve 72 in its closed position, by opening the valve member 24 of valve chuck 20, an initial reading may be taken with respect to the pressure within the deflated tire.

It is important that the operator take an initial pressure reading of the deflated tire if it is not completely flat before initiating transfer of air from the inflated tire. This allows an individual to determine how much air pressure should be transferred from one or more tires in order to effectively balance all the tires of the vehicle. That is, several tires may be needed to safely inflate the deflated tire.

Once initial pressure readings have been taken with respect to both the inflated and deflated tires, air transfer can be accomplished by the individual opening the valve members of each of the valve chucks and thereafter opening the control valve 72 to permit transfer of pressurized air from the inflated tire to the deflated tire.

One of the advantages of the present invention is that a determination can be made after an initial amount of air has been transferred between an inflated tire to a deflated tire as to whether or not an increase of air pressure has been established within the deflated tire. If a deflated tire has been damaged such that it cannot maintain tire pressure, there is no purpose in depleting air pressure within the inflated tires in an attempt to fill the deflated tire. Therefore, it is preferred that an individual will allow a transfer of a limited amount of pressurized air from the inflated tire to the deflated tire after which the primary control valve is closed to prevent further air transfer. With the primary valve 72 in a closed position, an immediate pressure reading can be taken with respect to the deflated tire. If the pressure remains stable it means that the deflated tire is retaining the pressure of air transferred by the initial limited amount of pressurized air which was allowed to enter the deflated tire. However, if the pressure reading after the initial pressurization decreases, there is an indication that the deflated tire has been damaged to the point where it will not retain air pressure and further transfer of air from the inflated tire should be terminated.

In view of the foregoing, a very quick determination can be made whether or not the deflated tire is actually retaining pressurized air which has been transferred thereto. If the tire is so badly damaged it will not retain air pressure, the pressure gauge will immediately reflect the loss of pressure buildup and an individual knows that further air transfer from the inflated tire to the deflated tire would have no value and could be counterproductive. However, if an increase in pressure is reflected on the pressure gauge and the pressure is retained, an individual will know that the deflated tire can retain an emergency supply of pressurized air to allow movement of the vehicle to a place where complete repair of the tire can be made. Thereafter the individual can open the primary control valve and permit further transfer of pressurized air to the deflated tire.

Again, in some instances it may be necessary to use two or more inflated tires to provide air pressure to the deflated tire so as not to deplete the air pressure of the inflated tires to a point that may be considered dangerous.

It is preferred, utilizing the methodology of the present invention, that a balancing of pressure between the various tires of a vehicle be accomplished to permit safe movement of the vehicle. Therefore, only a portion of the pressurized air from any one inflated tire should be made to the deflated tire. In this manner, the pressure between the various tires of the vehicle can be balanced.

Once the deflated tire has been sufficiently inflated, the apparatus of the invention can be quickly removed and compactly stored within the vehicle for further use. The coiling of the air transfer tube 11 allows for such compact storage.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A vehicle tire inflation apparatus including an elongated pliable air transfer tube having opposite ends, said air transfer tube defining a fluid passageway, a first sleeve mounted at one end of said air transfer tube, said first sleeve having a flow passageway therethrough and a control valve for selectively opening and closing said flow passageway, first and second valve chuck assemblies connected relative to said opposite ends of said air transfer tube so as to be in fluid communication with said fluid passageway, each of said first and second valve chuck assemblies including a housing, means for connecting each of said housings so as to be in fluid flow communication with a valve stem of a conventional tire, a valve mounted within each of said housings and moveable from a first position to prevent air flow through said housings to a second position to permit air flow through said housings, each of said first and second valve chuck assemblies including a manually engageable means for moving said valves between said first and second positions, said first sleeve being mounted between said first valve chuck assembly and one of said opposite end of said air transfer tube such that fluid flow between said first valve chuck assembly and said air transfer tube is controlled by said control valve, and a pressure gauge mounted to said first sleeve so as to be in fluid communication with said air passageway to determine fluid pressure therein.

2. The vehicle tire inflation apparatus of claim 1 wherein said pressure gauge is in communication with said fluid flow passageway intermediate said first valve chuck assembly and said control valve.

3. The vehicle tire inflation apparatus of claim 2 wherein said control valve is movable from a first closed position in which fluid flow through said flow passageway is prevented to a second open position wherein said flow passageway is opened, and means for normal urging said control valve to said first closed position.

4. The vehicle tire inflation device of claim 3 including means for rotatably mounting said first sleeve relative to said first valve chuck assembly and to said air transfer tube.

5. The vehicle tire inflation apparatus of claim 4 including fluid seal means for sealing each of said means for rotatable mounting said first sleeve relation to said first valve chuck assembly and to said air transfer tube.

6. The vehicle tire inflation apparatus of claim 3 including a valve chamber within said first sleeve in communication with said fluid passageway, said control valve including a valve body which is slidable disposed within said valve chamber, an operating lever mounted to said first sleeve and means for connecting said operating lever to said valve body for moving said valve body between said first closed and said second open positions.

7. The vehicle tire inflation apparatus of claim 3 including a second sleeve mounted between the other of said opposite ends of said air transfer tube and said second valve chuck assembly, and said second sleeve having a second flow passageway therethrough.

8. The vehicle tire inflation apparatus of the claim 7 including means for rotatable mounting said second sleeve relative to said second valve chuck assembly and said air transfer tube.

9. The vehicle tire inflation apparatus of claim 8 including fluid seals for sealing said means for rotatable mounting said second sleeve.

10. The vehicle tire inflation apparatus of claim 1 in which each housing is generally cylindrical including a channel formed within an interior sidewall thereof, each valve being generally cylindrical having a plurality of spaced openings therethrough which openings communicate with said channel when said valve is in said second position to permit air flow through said valve within said housing, and means for sealing said valve in sliding relationship with said housing.

11. The vehicle tire inflation apparatus of claim 10 including a plunger mounted to each of said valves, said plungers being adapted to engage a valve of a conventional tire valve stem when said valves are moved to said second position.

12. The vehicle tire inflation device of claim 11 including a connector means rotatably connected to each of said housings, each connector means being adapted to threadingly engage a conventional valve stem of a tire, means for securing said connector means to said housing so as to be movable with respect thereto, and means for sealing each of said connector means in air tight relationship with respect to said housings.

13. The vehicle tire inflation apparatus of claim 12 in which each means for moving said valves between said first and second positions includes a lever pivotally mounted to said housings, said levers engaging an upper surface of said valves, and resilient means for normally urging said valves towards said first position.

14. The vehicle tire inflation apparatus of claim 1 in which said air transfer tube is coiled to facilitate compact storage.

15. A vehicle tire inflation apparatus including an elongated pliable air transfer tube having opposite ends, said air transfer tube defining a fluid passageway, a first sleeve mounted at one of said ends of said air transfer tube and a second sleeve mounted at the opposite end, said first sleeve having a flow passageway therethrough and a control valve for selectively opening and closing said flow passageway, a first valve chuck assembly connected relative to said first sleeve opposite said air transfer tube so as to be in selective fluid communication with said fluid passageway and a second valve chuck mounted to said second sleeve opposite said air transfer tube so as to be in selective fluid communication with said fluid passage, each of said first and second valve chuck assemblies including a housing, means for connecting each of said housings so as to be in fluid flow communication with a valve stem of a conventional tire, a valve mounted within each of said housings and moveable from a first position to prevent air flow through said housings to a second position to permit air flow through said housings, each of said first and second valve chuck assemblies including a manually engageable means for moving said valves between said first and second positions, means for normally closing said flow passageway such that fluid flow between said first valve chuck assembly and said air transfer tube is normally prevented and a pressure gauge mounted to said first sleeve intermediate said control valve and said first valve chuck assembly so as to be in fluid communication with said air passageway to determine fluid pressure therein.

16. The vehicle tire inflation device of claim 15 including means for rotatably mounting said first and second sleeves relative to said first and second valve chuck assemblies and to said air transfer tube.

17. The vehicle tire inflation apparatus of claim 16 including fluid seal means for sealing each of said means for rotatable mounting said first and second sleeves relative to said first and second valve chuck assemblies and to said air transfer tube.

18. A method for transferring air between an inflated tire of a vehicle and a deflated tire of a vehicle using an air transfer tube with first and second valve chucks connected relative to opposite ends of the air transfer tube, the valve chucks being adapted to be secured to valve stems of vehicle tires and being operable to open or close valves associated with such valve stem, and wherein a sleeve is mounted between the first valve chuck and one of the opposite ends of the air transfer tube having a control valve for selectively opening and closing a flow passageway therethrough, and wherein a pressure gauge is mounted to the sleeve between the first valve chuck and the one end of the opposite ends of the air transfer tube, the method comprising the steps of:

a) connecting the second valve chuck to a valve stem of the inflated tire;

b) opening the second valve chuck connected to the inflated tire and then opening the control valve and determining the pressure within the inflated tire and thereafter closing the control valve;

c) with the first valve chuck connected to a valve stem of the deflated tire, opening the first valve chuck to determine the pressure of the deflated tire;

d) opening the second valve chuck connected to the inflated tire;

e) opening the control valve for a limited period of time to allow an initial transfer of air from the inflated tire to the deflated tire;

f) closing the control valve and monitoring the pressure within the deflated tire to determine if an increase in pressure has been established;

g) reopening the control valve to permit further air transfer to the deflated tire in the event the air pressure gauge shows the deflated tire is retaining pressure and allowing transfer of air until a predetermined decrease in pressure is determined within the inflated tire; and h) thereafter, closing the control valve to prohibit air flow through said air transfer tube between the inflated tire and the deflated tire.

* * * * *